US008734082B2

(12) United States Patent
Grant

(10) Patent No.: US 8,734,082 B2
(45) Date of Patent: May 27, 2014

(54) IMPLEMENT SUPPORT DEVICE

(76) Inventor: David E. Grant, Old Town, ME (US)

( * ) Notice: Subject to any disclaimer, the term of this patent is extended or adjusted under 35 U.S.C. 154(b) by 518 days.

(21) Appl. No.: 13/229,306

(22) Filed: Sep. 9, 2011

(65) Prior Publication Data

US 2013/0064633 A1 Mar. 14, 2013

(51) Int. Cl.
*B60P 9/00* (2006.01)

(52) U.S. Cl.
USPC .......... 414/462

(58) Field of Classification Search
CPC .......... B60P 1/025; B60P 1/64; B60P 1/6409; B60P 1/6418; B60P 1/6436; B60P 1/6472; B60P 1/649; B60P 3/06; B60P 3/07; B60P 3/073; B60P 3/125; B66F 9/06; B66F 9/061; B66F 9/14
USPC ......... 414/462, 467, 468, 471, 477, 478, 479, 414/495, 546, 547, 549, 550, 551, 553, 620, 414/629, 631, 633, 665, 785
See application file for complete search history.

(56) References Cited

U.S. PATENT DOCUMENTS

| | | | | | |
|---|---|---|---|---|---|
| 2,774,494 | A | * | 12/1956 | Malmstrom | 414/546 |
| 3,126,110 | A | * | 3/1964 | Dinkloh | 414/546 |
| 4,273,500 | A | | 6/1981 | Yates | |
| 4,394,107 | A | | 7/1983 | Siebert | |
| 4,421,449 | A | | 12/1983 | Cotton | |
| 4,799,850 | A | | 1/1989 | Petitto, Sr. et al. | |
| 4,955,777 | A | | 9/1990 | Ineson | |
| 6,099,234 | A | | 8/2000 | Mason | |

* cited by examiner

*Primary Examiner* — Saul Rodriguez
*Assistant Examiner* — Brendan Tighe
(74) *Attorney, Agent, or Firm* — Anthony D. Pellegrini

(57) ABSTRACT

An improved implement support device for using an implement with a motor vehicle, with the device having an implement support structure, a lift mechanism, and a swing mechanism, where the implement support structure is suitably adapted to support and manipulate useful implements, such as a snowplow blade, a pair of fork lift forks, a container, a platform, and the like, with the lift mechanism suitably adapted to move the implement vertically in both an upward and a downward direction and the swing mechanism suitably adapted to move the implement laterally in both a leftward and a rightward direction, and with the implement able to be concurrently moved both vertically and laterally by substantially simultaneous operation of both the lift mechanism and the swing mechanism.

30 Claims, 10 Drawing Sheets

IMPLEMENT SUPPORT DEVICE

BACKGROUND OF THE INVENTION

1. Technical Field

The present invention relates generally to the field of work implements. More particularly, the present invention is directed to work implements that may be attached to motor vehicles which can be manipulated to perform useful work.

2. Description of Prior Art

Work implements that are used with motor vehicles are well known in the art. These range from snowplow blades to fork lifts to lift platforms to front end loader buckets and the like. These implements can be attached to special purpose heavy duty machinery, or to small single purpose machinery, or to general purpose machinery, such as automobiles, pickup trucks, or garden tractors.

A typical work implement typically has two degrees of motion: vertical movement and pivotal movement. This is most commonly seen on a show plow blade. Snowplow blades known in the art are attached to the front of a vehicle, such as a pickup truck, by a triangular frame that is attached to the undercarriage of the front end of the vehicle. The triangular frame attaches to the back side of the snowplow blade at a single point. The snowplow blade is capable of pivoting at the connection point; the frame is also capable of raising and lowering the snowplow blade vertically.

A work implement such as lifting forks typically has even fewer degrees of motion. A lifting fork can be raised and lowered. In some applications the length of the lifting forks can be elongated or shortened. Similarly, a front end loader bucket can be raised and lowered, and pivoted to dump its load.

However, none of the work implements known in the art combine lifting and pivoting with lateral movement. That is, the implement remains fixedly oriented to the vehicle with regard to lateral movement, resulting in no lateral movement of the implement relative to the vehicle. Thus, a vehicle carrying a snowplow blade can only plow snow located directly in front of it; to plow snow located to one side the vehicle must be repositioned. This is problematic, for example, when attempting to remove snow that has built up into very high banks on the side of a road. Large, industrial snowplows have offset snowplow blades that extend laterally from the vehicle, to accomplish this task. However, a small plow vehicle, such as a pickup truck, cannot get behind a high snow bank to push it aside; the volume of snow is too great. Similarly, a vehicle carrying lifting forks must align directly behind the object to be lifted; if the object is off to one side, the vehicle must be repositioned. Also, if the load need be placed to one side, the vehicle must be repositioned. The same goes for front end loader buckets, and the like.

In addition to the limitation of movement of the implement, know implement support devices are extremely heavy. A typical snowplow blade attachment frame is so heavy, for example, that attaching one to a pickup truck often voids the vehicle's manufacturer's warranty. Moreover, such devices are designed to be attached only to the front end of the carrying vehicle. This limits the possible configurations available for the implement.

It is therefore shown that there is a need for an improved implement support device that can support and manipulate useful implements over an extended range of dimensions, including lateral movement of the implement relative to the carrying vehicle.

It is thus an object of the present invention to provide an improved implement support device that can support and manipulate useful implements over an extended range of dimensions.

It is a further object of the present invention to provide an improved implement support device that can move a useful implement laterally relative to the carrying vehicle.

It is yet a further object of the present invention to provide an improved implement support device that can support and manipulate useful implements over an extended range of dimensions simultaneously.

It is yet a further object of the present invention to provide an improved implement support device that can support and manipulate useful implements both vertically and laterally substantially simultaneously.

It is yet a further object of the present invention to provide an improved implement support device that is light weight.

It is yet a further object of the present invention to provide an improved implement support device that can be attached to the front end, the back end, or the side of a vehicle.

Other objects of the present invention will be readily apparent from the description that follows.

SUMMARY OF THE INVENTION

The improved implement support device of the present invention may be attached to the undercarriage of the front, rear, or side of a wide range of motorized vehicles. The basic components of the device include an implement support structure suitably adapted to support the implement, a lift mechanism suitably adapted to raise and lower the implement substantially vertically in both an upward direction and a downward direction, and a swing mechanism suitably adapted to move the implement substantially laterally in both a leftward direction and a rightward direction. The implement support structure comprises one or more implement support arms, each of which is pivotally attached at one end to the undercarriage of the vehicle and at the other end to the implement. The lift and swing mechanisms move the one or more implement support arms vertically and laterally. The lifting movement can be independent of the swinging movement, or both movements can occur substantially simultaneously.

The lifting movement of the implement support structure is achieved indirectly, through the manipulation of a rotating cross member. The rotating cross member is rotationally attached to the undercarriage of the vehicle and oriented substantially perpendicular to and above the one or more implement support arms. Hingedly attached to the rotating cross member are one or more lift arms, each lift arm corresponding to one of the one or more implement support arms. Each lift arm is suitably adapted to support and slidably engage its corresponding implement support arm. That is, the implement support arm is capable of movement relative to the lift arm while being supported by the lift arm. The lift arms cannot move vertically relative to the rotating cross member. Thus, rotation of the rotating cross member will pivot the one or more lift arms vertically. This vertical movement of the one or more lift arms causes vertical movement in the corresponding one or more implement support arms. The rotating cross member can be rotated by any means known in the art. In the preferred embodiments, one or more hydraulic pistons are used to pivot one or more lever arms fixedly attached to the rotating cross member. As the one or more lever arms are moved, the rotating cross member is rotated. Reversing electric motors may also be used to rotate the rotating cross member.

The swinging movement of the implement support structure is achieved indirectly. Because the one or more lift arms are hingedly attached to the rotating cross member, they may swing laterally relative to the rotating cross member. The swing mechanism moves the one or more lift arms laterally relative to the rotating cross member. This lateral movement of the one or more lift arms causes lateral movement in the corresponding one or more implement support arms. The lift arms can be moved laterally by any means known in the art. In the preferred embodiments, one or more hydraulic pistons are used to move the one or more lift arms laterally.

In the preferred embodiments, lift and swing control mechanism are used to move the implement support arms vertically and laterally, respectively. In the most preferred embodiments the lift and swing movements are integrated, such as by use of a joy stick, to substantially simultaneously position the implement.

Other features and advantages of the present invention are described below.

DETAILED DESCRIPTION OF THE INVENTION

Figure 1:
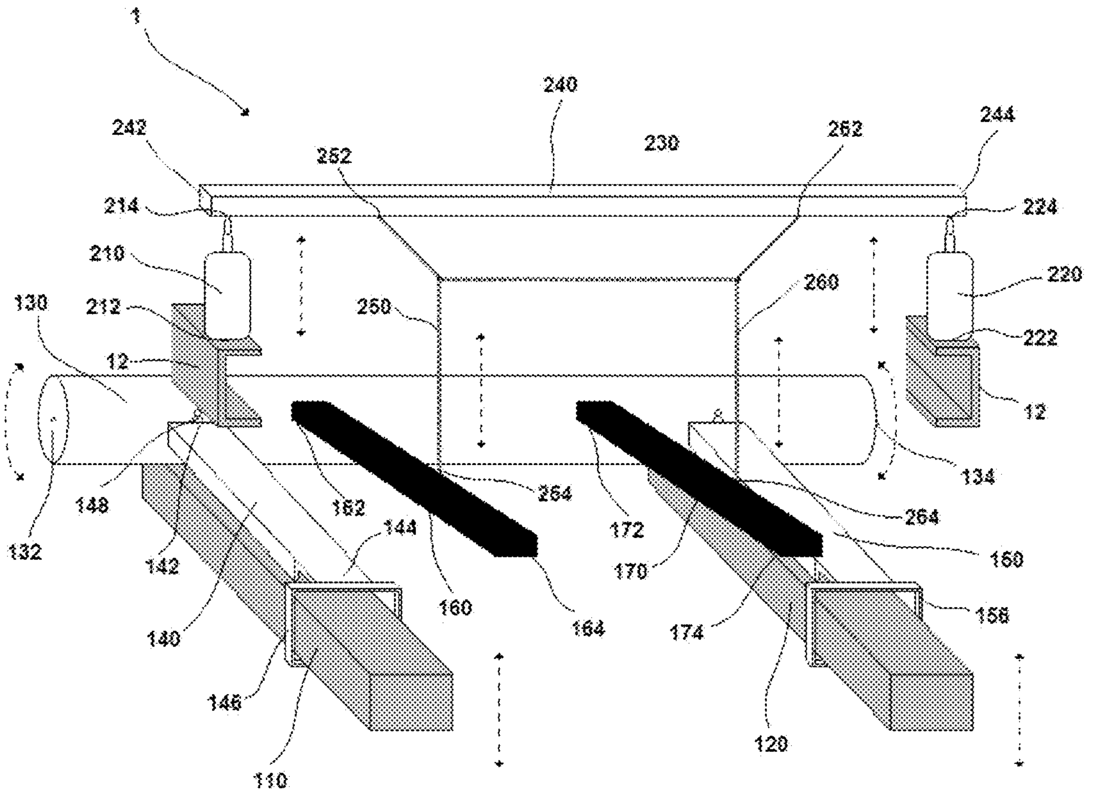
FIG. 1 is a perspective front view of the implement support structure and lift mechanism of one embodiment of the device of the present invention.

The present invention discloses an improved implement support device 1 for use with a motor vehicle 10, such as a passenger car, a truck, a garden tractor, a logging skidder, and the like. The device 1 comprises an implement support structure, a lift mechanism, and a swing mechanism. The implement support structure is suitably adapted to support and manipulate useful implements, such as a pair of fork lift forks 820, a snowplow blade 830, a container 840, a platform 850, and the like. The implement support structure is attached to the undercarriage 12 of the vehicle 10. The lift mechanism is suitably adapted to move the useful implement vertically in both an upward direction and a downward direction. The swing mechanism is suitably adapted to move the useful implement laterally in both a leftward direction and a rightward direction. The useful implement may be concurrently moved both vertically and laterally by substantially simultaneous operation of both the lift mechanism and the swing mechanism.

Figure 3A:
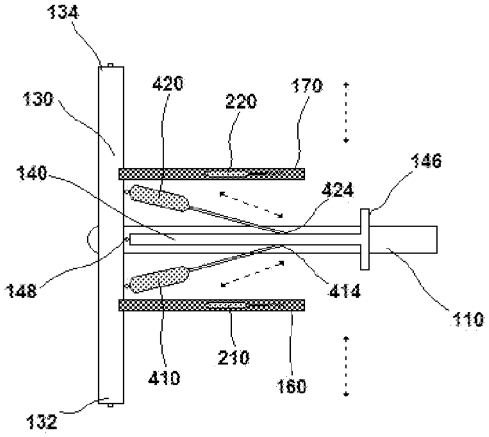
FIG. 3A is a plan top view of the implement support structure and swing mechanism components of yet another embodiment of the device of the present invention having just one implement support arm.
Figure 7:
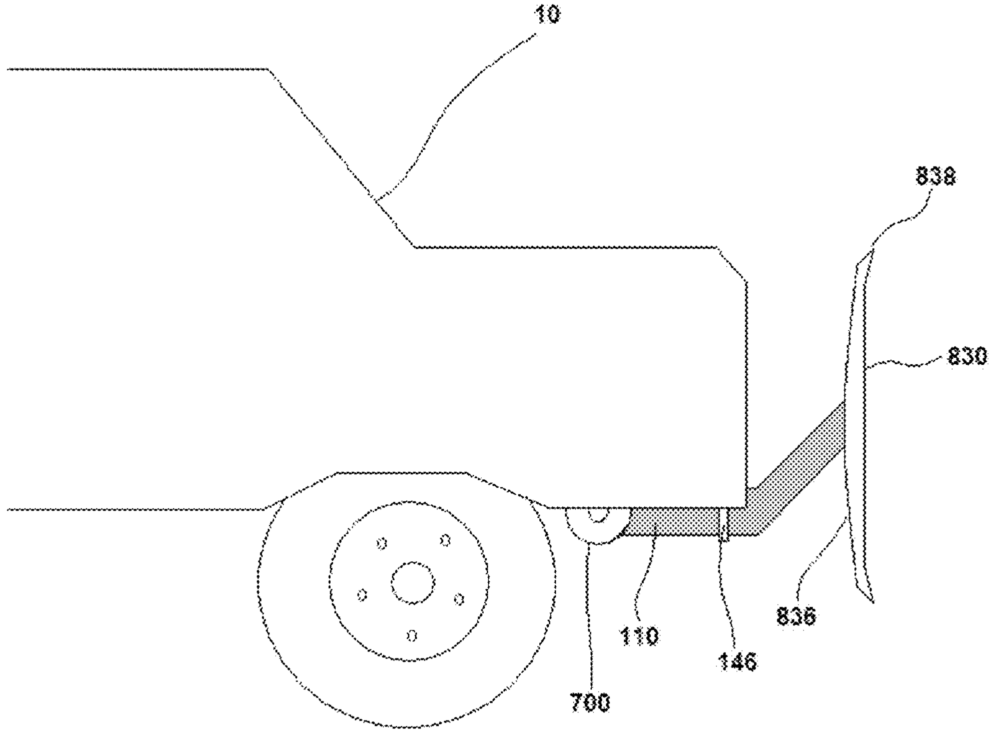
FIG. 7 is a plan side view of a vehicle fitted with one embodiment of the device of the present invention, carrying a snowplow blade.
Figure 11:
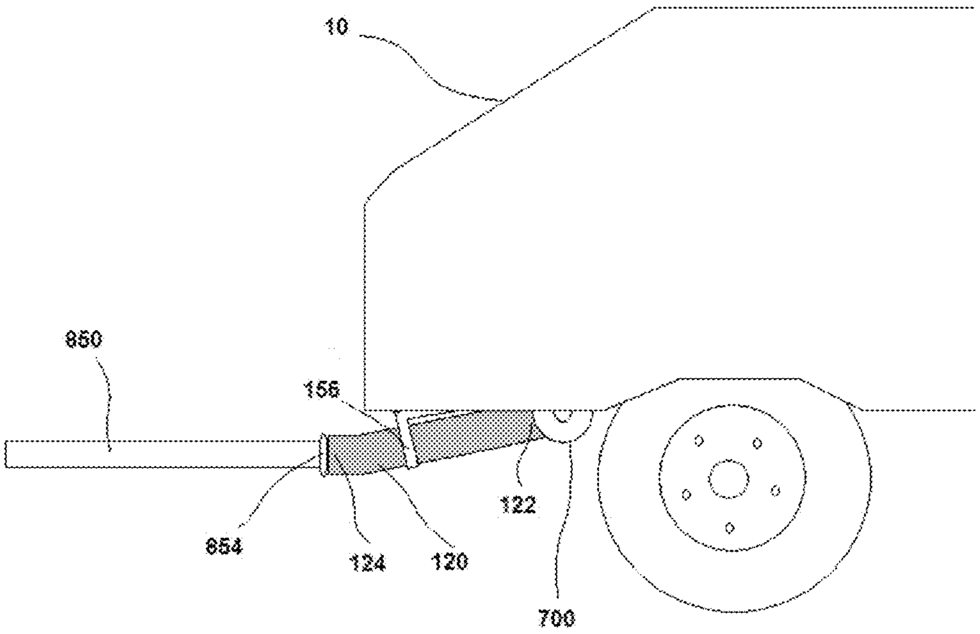
FIG. 11 is a plan side view of a vehicle fitted with one embodiment of the device of the present invention, carrying a platform extending from the rear of the vehicle.

The implement support structure comprises a first implement support arm 110, a rotating cross member 130, a first lift arm 140, and a first lever arm 160. See FIGS. 1 and 3A. The first implement support arm 110 is elongate, substantially rigid, and is constructed of any suitable material, such as iron, steel, aluminum, composites, and the like. In one embodiment the first implement support arm 110 is constructed of square iron. The first implement support arm 110 is attached at its proximate end 112 to the undercarriage 12 of the vehicle 10, and its distal end 114 extends from the vehicle 10. Depending on the configuration, the distal end 114 of the first implement support arm 110 may extend forward from the front of the vehicle 10 (for example, when the implement is a snowplow blade 830, see FIG. 7), from the back of the vehicle 10 (for example, when the implement is a platform 850, see FIG. 11), or from the side of the vehicle 10.

Figure 6:
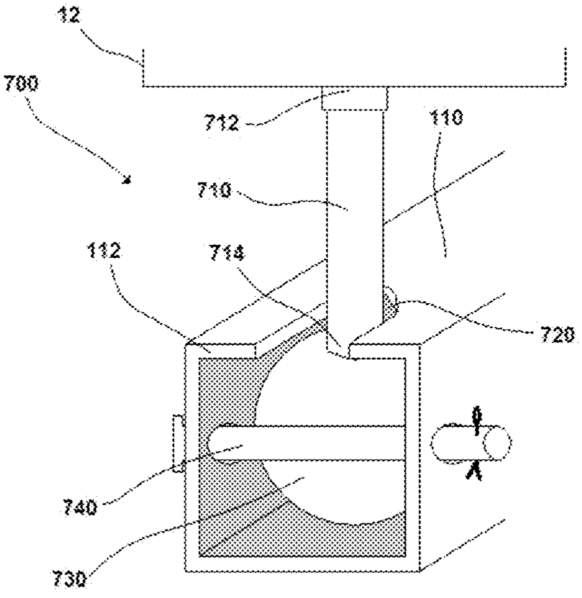
FIG. 6 is a perspective rear view of the attachment component of the implement support arm of one embodiment of the device of the present invention.

In preferred embodiments the first implement support arm 110 is pivotally attached to the undercarriage 12 of the vehicle 10 by an implement support arm attachment component 700. In such embodiments the implement support arm attachment component 700 may comprise a substantially rigid attachment shaft 710, which attaches at its proximate end 712 to the undercarriage 12 of the vehicle 10 and extends downward from the undercarriage 12 of the vehicle 10, terminating at its distal end 714 in a ball 730. The attachment shaft 710 is constructed of any suitable material, such as iron, steel, aluminum, composites, and the like. The proximate end 112 of the first implement support arm 110 is pivotally engaged with the ball 730 of the attachment shaft 710, by the proximate end 112 of the first implement support arm 110 at least partially encompassing and containing the ball 730, such that the first implement support arm 110 is capable of movement in relation to the ball 730. A slot 720 formed into the proximate end 112 of the first implement support arm 110 may be used to accommodate the attachment shaft 710. A pin 740 may be used to lock the ball 730 in place within the proximate end 112 of the first implement support arm 110. See FIG. 6. Alternatively, a bar may be welded across the opening of the slot 720 to retain the ball 730 in place within the proximate end 112 of the first implement support arm 110.

Figure 4A:
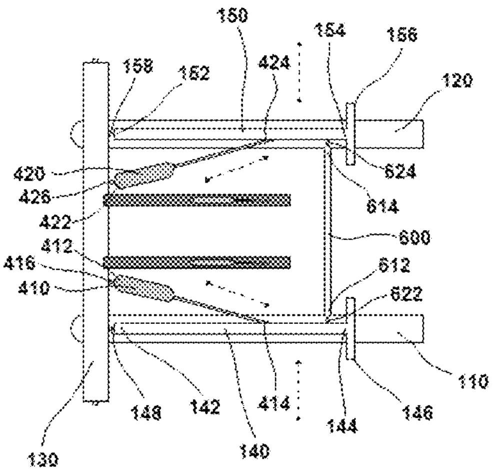
FIG. 4A is a plan top view of the implement support structure and swing mechanism components of yet another embodiment of the device of the present invention having first and second implement support arms.

In the preferred embodiment the implement support structure further comprises a second implement support arm 120. The second implement support arm 120 is dimensioned, configured, and constructed substantially identically to the first implement support arm 110. The second implement support arm 120 is attached at its proximate end 122 to the undercarriage 12 of the vehicle 10, and its distal end 124 extends from the vehicle 10 in the same manner as the distal end 114 of the first implement support arm 110. The second implement support arm 120 is spaced apart from the first implement support arm 110. See FIGS. 1 and 4A. In preferred embodiments the second implement support arm 120 is pivotally attached to the undercarriage 12 of the vehicle 10 in the same manner as described above with regard to the first implement support arm 110, namely by using an attachment shaft with a ball at its distal end. The attachment shaft and ball attaching the second implement support arm 120 is spaced apart from and oriented laterally to the attachment shaft and ball attaching the first implement support arm 110 and is dimensioned and configured substantially identical to the attachment shaft and ball attaching the first implement support arm 110.

In one embodiment the first implement support arm 110 has an upwardly angled bend between its proximate and distal ends 112,114, and the second implement support arm 120 (if present) has an upwardly angled bend between its proximate and distal ends 122,124, with the two upwardly angled bends of the first and second implement support arms 110,120 being substantially the same. See FIGS. 2A, 7, and 9-11. This configuration allows for greater vertical movement of the first and second implement support arms 110,120.

In another embodiment the distal end 114 of the first implement support arm 110 is removably attached to the proximate end 112 of the first implement support arm 110, and the distal end 124 of the second implement support arm 120 (if present) is removably attached to the proximate end 122 of the second implement support arm 120. This configuration allows the device 1 to remain attached to the vehicle 10 when the implement is removed from the vehicle 10 and the device 1 is not otherwise being used, as the extension of the implement support arms 110,120 from the underside of the vehicle 10 is minimized or eliminated. The mechanism for removably attaching the proximate and distal ends 114,124 of the first and second implement support arms 110,120, respectively, may be any mechanism known in the art suitable to achieving the purpose described above. For example, in one embodiment the attachment may be achieved by one of the ends having a smaller outer diameter than the inner diameter of the other end, whereby the smaller end is fit into the larger end. A cotter pin or other similar device could be used to hold the two ends together. In other embodiments the ends could be threaded. In other embodiments the ends could employ flanges and slots.

Figure 2A:
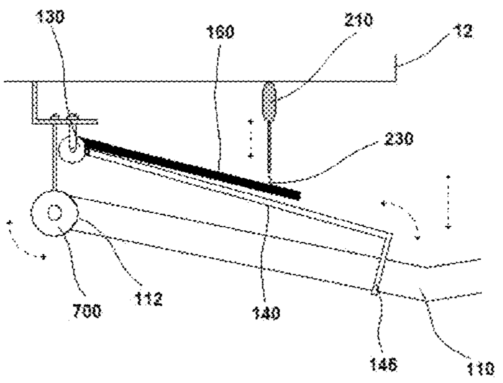
FIG. 2A is a plan side view of the implement support structure and lift mechanism components of another embodiment of the device of the present invention.
Figure 2B:
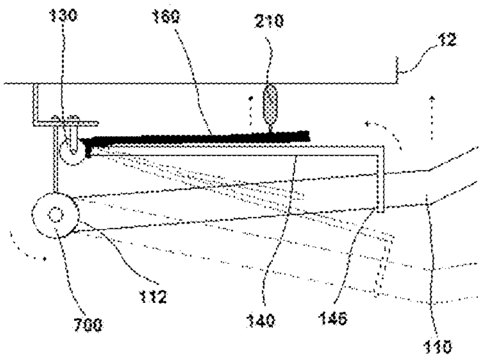
FIG. 2B is a plan side view of the components depicted in FIG. 2A having been raised by the lift mechanism, with the original position of the components shown in ghost line.

The rotating cross member 130 of the implement support structure is elongate, substantially rigid, has a first end 132 and a second end 134, and is constructed of any suitable material, such as iron, steel, aluminum, composites, and the like. In one embodiment the rotating cross member 130 is constructed of square iron. In another embodiment the rotating cross member 130 is constructed of iron pipe. See FIG. 1. The rotating cross member 130 is rotationally attached to the undercarriage 12 of the vehicle 10 and oriented substantially lateral to the vehicle 10. See FIGS. 2A and 2B. It is located above the proximate ends 112,122 of the first and second implement support arms 110,120 or, where only a single implement support arm is used, above the proximate end of the single implement support arm.

Figure 5:
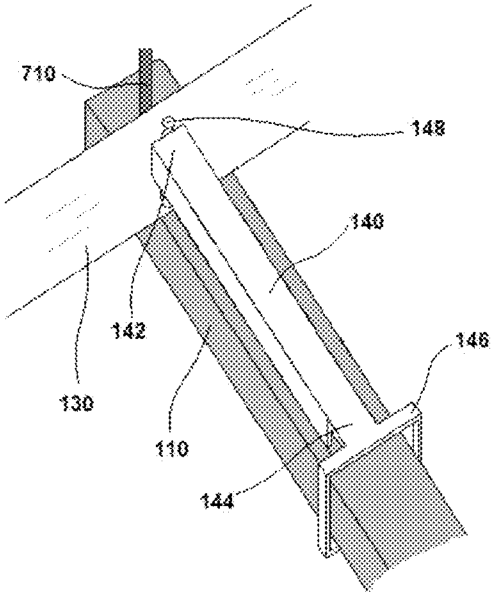
FIG. 5 is a partial perspective top view of the implement support structure of one embodiment of the device of the present invention.

The first lift arm 140 of the implement support structure is elongate, substantially rigid, has an open bracket 146 located at its distal end 144, and is constructed of any suitable material, such as iron, steel, aluminum, composites, and the like. See FIGS. 1 and 5. In one embodiment the first lift arm 140 is constructed of square iron. The first lift arm 140 is attached at its proximate end 142 to the rotating cross member 130 at a point proximate to one end 132 of the rotating cross member 130. In preferred embodiments the first lift arm 140 is hingedly attached to the rotating cross member 130 by a first hinge 148, whereby the first lift arm 140 is capable of lateral movement relative to the rotating cross member 130. The first lift arm 140 is located above and substantially collinear with the first implement support arm 110. The open bracket 146 at the distal end 144 of the first lift arm 140 is suitably adapted to retain within it a portion of the first implement support arm 110. In one embodiment the bracket 146 is substantially rectangular. In other embodiments the bracket 146 may be circular or irregularly shaped. The first lift arm 140 is capable of supporting the first implement support arm 110. The portion of the first implement support arm 110 retained within the open bracket 146 of the first lift arm 140 is slidably adjacent therewith. Where only a single implement support arm is used, the first lift arm 140 may be attached at its proximate end to the rotating cross member 130 at a point proximate to the center of the rotating cross member 130.

In the preferred embodiments of the implement support structure having a second implement support arm 120, there is also a second lift arm 150. See FIG. 1. The second lift arm 150 is dimensioned, configured, and constructed substantially identically to the first lift arm 140. The second lift arm 150 is attached at its proximate end 152 to the rotating cross member 130 at a point proximate to the opposite end 134 of the rotating cross member 130 from the first lift arm 140. The second lift arm 150 is spaced apart from the first lift arm 140 and is located above and substantially collinear with the second implement support arm 120. In preferred embodiments the second lift arm 150 is hingedly attached to the rotating cross member 130 by a second hinge 158, whereby the second lift arm 150 is capable of lateral movement relative to the rotating cross member 130. The open bracket 156 at the distal end 154 of the second lift arm 150 is suitably adapted to retain within it a portion of the second implement support arm 120. The second lift arm 150 is capable of supporting the second implement support arm 120. The portion of the second implement support arm 120 retained within the open bracket 156 of the second lift arm 150 is slidably adjacent therewith.

In the preferred embodiments of the implement support structure having both a first and second lift arm 140,150, the implement support structure may further comprise a horizontal brace 600. See FIG. 4A. The horizontal brace 600 is substantially rigid and has a first end 612 and a second end 614, with the horizontal brace 600 being hingedly attached at its first end 612 to the first lift arm 140 by a first hinge 622 and hingedly attached at its second end 614 to the second lift arm 150 a second hinge 624. The use of the horizontal brace 600 adds stability and rigidity to the implement support structure.

The first lever arm 160 of the implement support structure is elongate, substantially rigid, and is constructed of any suitable material, such as iron, steel, aluminum, composites, and the like. See FIG. 1. In one embodiment the first lever arm 160 is constructed of square iron. The first lever arm 160 is fixedly attached at its proximate end 162 to the rotating cross member 130 and is oriented substantially perpendicular thereto. The first lever arm 160 is suitably adapted to rotate the rotating cross member 130 when the distal end 164 of the first lever arm 160 is moved substantially vertically in either an upward direction or a downward direction.

In preferred embodiments the implement support structure comprises a second lever arm 170. See FIG. 1. The second lever arm 170 is dimensioned, configured, and constructed substantially identically to the first lever arm 160. The second lever arm 170 is fixedly attached at its proximate end 172 to the rotating cross member 130 and is oriented substantially perpendicular thereto. The second lever arm 170 is spaced apart from and is substantially parallel to the first lever arm 160. The second lever arm 170 is suitably adapted to rotate the rotating cross member 130 when the distal end 174 of the second lever arm 170 is moved substantially vertically in either an upward direction or a downward direction.

In one embodiment of the device 1 of the present invention the lift mechanism comprises a first lift device 210. See FIGS. 1 and 2A. The first lift device 210 is any suitable device adapted to move the distal end 164 of the first lever arm 160 substantially vertically in both an upward direction and a downward direction. In the preferred embodiment the first lift device 210 is a hydraulic piston. The first lift device 210 is attached at one end 212 to the undercarriage 12 of the vehicle 10, and is attached at the other end 214 to the first lever arm 160, either directly or indirectly. In one embodiment the first lift device 210 is attached to the first lever arm 160 by a chain 230. See FIG. 2A. In other embodiments the first lift device 210 is attached to the first lever arm 160 by a cable. See FIG. 1. In embodiments having a second lift arm 150, the lift mechanism further comprises a second lift device 220, attached at is proximate end 222 to the undercarriage 12 of the vehicle 10, configured substantially identical to the first lift device 210.

In yet another embodiment employing two lever arms 160, 170 and two lift devices 210,220, the lift mechanism further comprises a lift bar 240, a first lift cable 250, and a second lift cable 260. See FIG. 1. The lift bar 240 is substantially rigid and has a first end 242 and a second end 244, and is oriented substantially perpendicular to the axis of the first and second implement support arms 110,120. The first lift cable 250 has a first end 252 and a second end 254 and the second lift cable 260 has a first end 262 and a second end 264. The distal end 214 of the first lift device 210 is attached to the lift bar 240 proximate to the first end 242 of the lift bar 240 and the distal end 224 of the second lift device 220 is attached to the lift bar 240 proximate to the second end 244 of the lift bar 240. The first end 252 of the first lift cable 250 is attached to the lift bar 240 proximate to the first end 242 of the lift bar 240 and the first end 262 of the second lift cable 260 is attached to the lift bar 240 proximate to the second end 244 of the lift bar 240. The second end 254 of the first lift cable 250 is attached to the first lever arm 160 and the second end 264 of the second lift cable 260 is attached to the second lever arm 170. So configured, the first and second lift devices 210,220 are suitably adapted to move the lift bar 240 substantially vertically in both an upward direction and a downward direction, causing the first and second lift cables 250,260 to move substantially vertically in both an upward direction and a downward direction, moving the distal ends 164,174 of the first lever arm 160 and the second lever arm 170 substantially vertically in both an upward direction and a downward direction, causing bi-directional rotation of the rotating cross member 130. In alternative embodiments using only a single implement support arm and lift arm, the described movements of the lift bar 240 and first and second lift cables 250,260 affect movement only of the single implement support arm and lift arm.

The device 1 of the present invention may further comprise a lift control mechanism. The lift control mechanism is suitably adapted to control the first lift device 210 to achieve the vertical movement of the distal end 164 of the first lever arm 160 in an upward direction and in a downward direction. Where a second lift device 220 and a second lever arm 170 are used, the lift control mechanism is suitably adapted to simultaneously control the second lift device 220 to achieve the vertical movement of the distal end 174 of the second lever arm 170 in an upward direction and in a downward direction, with the movements of the first and second lift devices 210, 220 being substantially identical and synchronous, such that control of the first lift device 210 and the second lift device 220 by the lift control mechanism results in vertical movement of the distal ends 164,174 of the first lever arm 160 and the second lever arm 170 in an upward direction and in a downward direction. The lift control mechanism may be any suitable mechanism known in the art and may be electrically powered, hydraulically powered, or the like.

In one embodiment of the device 1 of the present invention the swing mechanism comprises a first swing device 410 and a second swing device 420. See FIG. 4A. The first swing device 410 is attached at a proximate end 412 to the rotating cross member 130 and at a distal end 414 to the first lift arm 140. The proximate and distal ends 412,414 of the first swing device 410 may be hingedly attached to the rotating cross member 130 and the first lift arm 140, respectively, by a first hinge 416. The second swing device 420 is attached at a proximate end 422 to the rotating cross member 130 and at a distal end 424 to the second lift arm 150. The proximate and distal ends 422,424 of the second swing device 420 may be hingedly attached to the rotating cross member 130 and the second lift arm 150, respectively, by a second hinge 426. The first swing device 410 is any suitable device adapted to move the distal end 144 of the first lift arm 140 substantially laterally in both a leftward direction and a rightward direction. Similarly, the second swing device 420 is any suitable device adapted to move the distal end 154 of the second lift arm 150 substantially laterally in both a leftward direction and a rightward direction. In the preferred embodiment the first and second swing devices 410,420 are hydraulic pistons.

In an embodiment having only a single lift arm, the first swing device 410 is attached at a proximate end 412 to the rotating cross member 130 and at a distal end 414 to the first lift arm 140. See FIG. 3A. The proximate and distal ends 412,414 of the first swing device 410 may be hingedly attached to the rotating cross member 130 and the first lift arm 140, respectively. The second swing device 420 is attached at a proximate end 422 to the rotating cross member 130 and at a distal end 424 to the first lift arm 140 opposite the first swing device 410. The proximate and distal ends 422,424 of the second swing device 420 may be hingedly attached to the rotating cross member 130 and the first lift arm 140, respectively. So configured, the first swing device 410 moves the distal end 144 of the first lift arm 140 substantially laterally in a leftward direction and the second swing device 420 moves the distal end 144 of the first lift arm 140 substantially laterally in a rightward direction.

In another embodiment the first swing device 410 is attached at its proximate end 412 to the undercarriage 12 of the vehicle 10 and attached at its distal end 414 to the first implement support arm 110. The proximate and distal ends 412,414 of the first swing device 410 may be hingedly attached to the undercarriage 12 of the vehicle 10 and the first implement support arm 110, respectively. Similarly, the second swing device 420 is attached at its proximate end 422 to the undercarriage 12 of the vehicle 10 and hingedly attached at its distal end 424 to the second implement support arm 120. The proximate and distal ends 422,424 of the second swing device 420 may be hingedly attached to the undercarriage 12 of the vehicle 10 and the second implement support arm 120, respectively. The attachment points of the proximate and distal ends 414,424 of the first and second swing devices 410,420 may be alternated among those described in the previous three embodiments, as well.

The device 1 of the present invention may further comprise a swing control mechanism. The swing control mechanism is suitably adapted to simultaneously control the first and second swing devices 410,420, with the movements of the first and second swing devices 410,420 being substantially inverse and synchronous, such that control of the first and second swing devices 410,420 by the swing control mechanism results in lateral movements of the distal ends 144,154 of the first and second lift arms 140,150 in a leftward direction and in a rightward direction. The swing control mechanism may be any suitable mechanism known in the art and may be electrically powered, hydraulically powered, or the like. In one embodiment the lift control mechanism and the swing control mechanism may be integrated into a single unit. In such an embodiment a single joystick or other similar control device may be used to activate both the lift control mechanism and the swing control mechanism.

The foregoing components of the implement support structure and the swing mechanism interact as follows: The first and second lift arms 140,150 support the first and second implement support arms 110,120, respectively, from above, by containing portions of the first and second implement support arms 110,120 within the brackets 146,156 of the first and second lift arms 140,150, respectively. See FIG. 2A. The lift mechanism moves the distal ends 164,174 of the first lever arm 160 and the second lever arm 170, causing bi-directional rotation of the rotating cross member 130. Rotation of the rotating cross member 130 causes the distal ends 144,154 of the first and second lift arms 140,150 to move vertically. Vertical movement of the distal ends 144,154 of the first and second lift arms 140,150 causes the distal ends 114,124 of the first and second implement support arms 110,120 to move vertically. See FIG. 2B. Any implement attached to the distal ends 114,124 of the first and second implement support arms 110,120 thus also moves vertically.

Figure 3B:
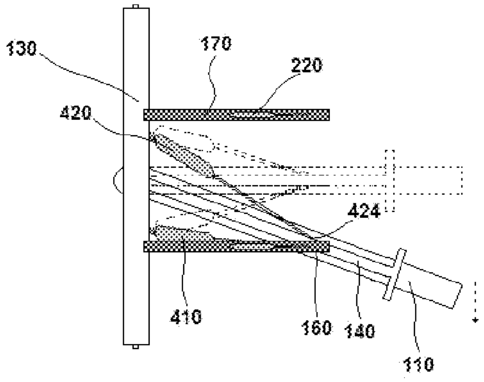
FIG. 3B is a plan top view of the components depicted in FIG. 3A having been swung to the right by the swing mechanism, with the original position of the components shown in ghost line.
Figure 4B:
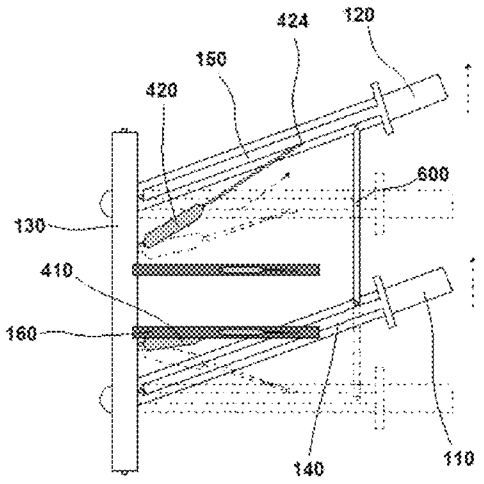
FIG. 4B is a plan top view of the components depicted in FIG. 4A having been swung to the left by the swing mechanism, with the original position of the components shown in ghost line.

The swing mechanism moves the distal end 114 of the first implement support arm 110 substantially laterally in both a leftward direction and a rightward direction, and moves the distal end 124 of the second implement support arm 120 substantially laterally in both a leftward direction and a rightward direction. See FIGS. 3B and 4B. Lateral movement of the distal ends 114,124 of the first and second implement support arms 110,120 causes any implement attached to the distal ends 114,124 of the first and second implement support arms 110,120 to also move laterally.

Because the positions of the first and second lift arms 140,150 relative to the first and second implement support arms 110,120, respectively, change somewhat when these components move, either vertically or laterally, the first and second implement support arms 110,120 slide within the brackets 146,156 of the first and second lift arms 140,150, respectively, during lifting and swinging. By combining operation of the lift mechanism with operation of the swing mechanism any implement attached to the distal ends 114, 124 of the first and second implement support arms 110,120 can be moved both vertically and laterally substantially at the same time. In alternative embodiments using only a single implement support arm and lift arm, the described interactions of the components remain the same except only one implement support arm and lift arm is moved by the lift mechanism and the swing mechanism.

Figure 8A:
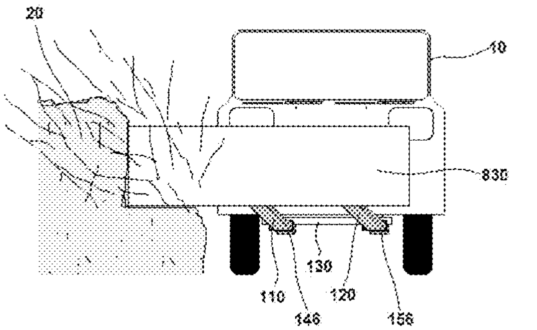
FIG. 8A is a plan front view of a vehicle fitted with one embodiment of the device of the present invention, using a snowplow blade "winged out" to the right to cut down the height of a snow bank.
Figure 8B:
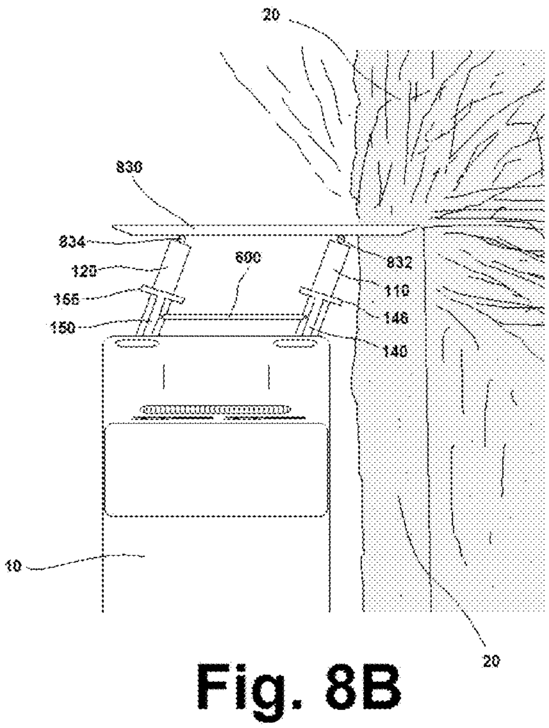
FIG. 8B is a plan top view of the vehicle depicted in FIG. 8A.
Figure 9:
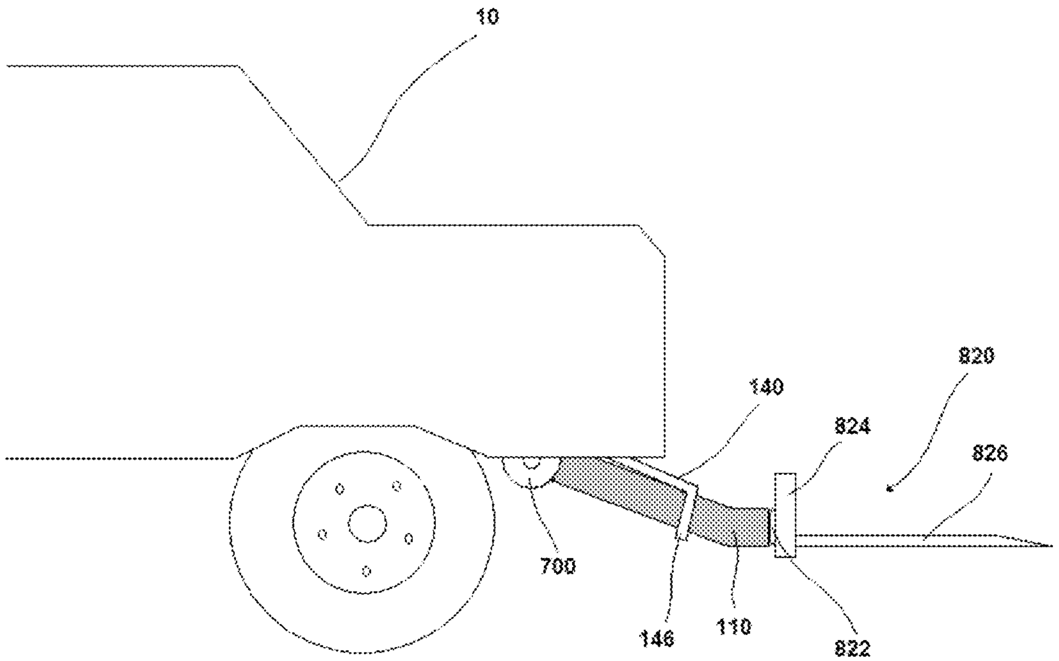
FIG. 9 is a plan side view of a vehicle fitted with one embodiment of the device of the present invention, carrying a pair of lifting forks.
Figure 10:
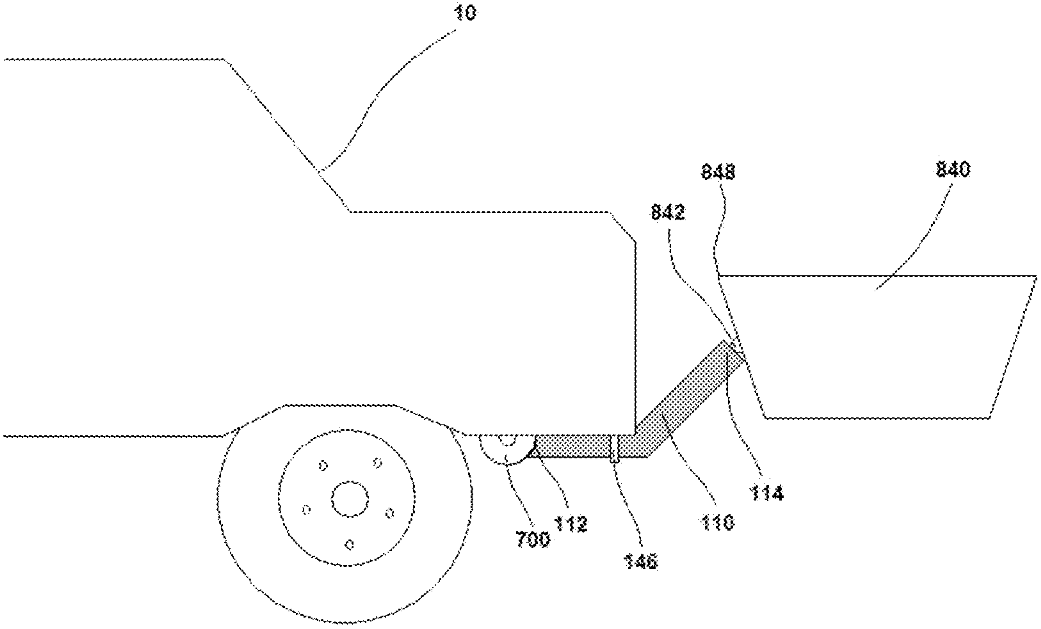
FIG. 10 is a plan side view of a vehicle fitted with one embodiment of the device of the present invention, carrying a container.

The device 1 of the present invention may be used with various types of implements. One such implement is a snowplow blade 830. See FIGS. 7, 8A, and 8B. In this embodiment the snowplow blade 830 has a connection point located on its back side 836, substantially centered on the midline of the snowplow blade 830. If the device 1 comprises both a first and second implement support arm 110,120 the snowplow blade 830 has a first connection point 832 and a second connection point 834 located on its back side 836, with the first connection point 832 located substantially the same distance from the vertical midline of the snowplow blade 830 as the second connection point 834, on the opposite side of the midline of the snowplow blade 830. In addition, the first and second connection points 832,834 are located substantially equidistance from the top edge 838 of the snowplow blade 830. In this embodiment the first implement support arm 110 is pivotally attached at its distal end 114 to the snowplow blade 830 at the first connection point 832 of the snowplow blade 830 and the second implement support arm 120 is pivotally attached at its distal end 124 to the snowplow blade 830 at the second connection point 834 of the snowplow blade 830. So configured, movement of the first and second implement support arms 110,120 by either or both of the lift mechanism or the swing mechanism causes the snowplow blade 830 to be moved in either a substantially vertical direction or in a substantially lateral direction or a combination of both substantially vertical and substantially lateral directions. Being able to position a snowplow blade 830 laterally relative to the vehicle 10 allows for more efficient snow removal in certain circumstances, such as when cutting down excessive accumulation of snow 20 on the side of the road. By extending the snowplow blade 830 upward and laterally, the vehicle 10 can remove the upper portion of a snow bank 20. See FIGS. 8A and 8B.

Another type of implement is a pair of independent lifting forks. In this embodiment a first lifting fork is attached to the distal end 114 of the first implement support arm 110, and a second lifting fork is attached to the distal end 124 of the second implement support arm 120. So configured, movement of the first and second implement support arms 110,120 by either or both of the lift mechanism or the swing mechanism causes the pair of lifting forks to be moved in either a substantially vertical direction or in a substantially lateral direction or a combination of both substantially vertical and substantially lateral directions.

Yet another type of implement is an integrated pair of lifting forks 820. See FIG. 9. In this embodiment a first lifting fork 826 is attached to a fork cross member 824 and a second lifting fork is attached to the fork cross member 824. The first and second lifting forks are oriented substantially parallel to each other on the same side of the fork cross member 824. On the opposite side of the fork cross member 824 from the first and second lifting forks are located a first connection point 822 and a second connection point. The first connection point 822 is located the same distance from the vertical midline of the fork cross member 824 as is the second connection point on the opposite side of the vertical midline of the fork cross member 824. The first implement support arm 110 is pivotally attached at its distal end 114 to the fork cross member 824 at the first connection point 822 of the fork cross member 824, and the second implement support arm 120 is pivotally attached at its distal end 124 to the fork cross member 824 at the second connection point of the fork cross member 824. So configured, movement of the first and second implement support arms 110,120 by either or both of the lift mechanism or the swing mechanism causes the integrated pair of lifting forks 820 to be moved in either a substantially vertical direction or in a substantially lateral direction or a combination of both substantially vertical and substantially lateral directions.

Yet another type of implement is a container 840. See FIG. 10. The container 840 can be of any appropriate configuration, such as a bucket as found on a front end loader. In this embodiment the container 840 has a connection point located on its back side, substantially centered on the midline of the container 840. If the device 1 comprises both a first and second implement support arm 110,120 the container 840 has a first connection point 842 and a second connection point located on its back side, with the first connection point 842 located substantially the same distance from the vertical midline of the container 840 as the second connection point, on the opposite side of the midline of the container 840. In addition, the first and second connection points are located substantially equidistance from the top edge 848 of the container 840. In this embodiment the first implement support arm 110 is pivotally attached at its distal end 114 to the container 840 at the first connection point 842 of the container 840 and the second implement support arm 120 is pivotally attached at its distal end 124 to the container 840 at the second connection point of the container 840. So configured, movement of the first and second implement support arms 110,120 by either or both of the lift mechanism or the swing mechanism causes the container 840 to be moved in either a substantially vertical direction or in a substantially lateral direction or a combination of both substantially vertical and substantially lateral directions.

Yet another type of implement is a platform 850. See FIG. 11. The platform 850 may be of any appropriate configuration, though it is substantially planar and oriented substantially horizontally. The platform 850 may be solid, such as being formed of a plank of wood or a sheet or metal, or porous, such as being formed of a metal mesh. In this embodiment the platform 850 has a connection point located on its rear edge, substantially centered on the midline of the platform 850. If the device 1 comprises both a first and second implement support arm 110,120 the platform 850 has a first connection point and a second connection point 854 located on its rear edge, with the first connection point located substantially the same distance from the vertical midline of the platform 850 as the second connection point 854, on the opposite side of the midline of the platform 850. In this embodiment the first implement support arm 110 is pivotally attached at its distal end 114 to the platform 850 at the first connection point of the platform 850 and the second implement support arm 120 is pivotally attached at its distal end 124 to the platform 850 at the second connection point 854 of the platform 850. So configured, movement of the first and second implement support arms 110,120 by either or both of the lift mechanism or the swing mechanism causes the platform 850 to be moved in either a substantially vertical direction or in a substantially lateral direction or a combination of both substantially vertical and substantially lateral directions.

What has been described and illustrated herein is a preferred embodiment of the improved implement support device 1 of the present invention, along with some it its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Other embodiments not specifically set forth herein are therefore also within the scope of the following claims.

I claim:

1. An improved implement support device suitably adapted to being attached to an undercarriage of a vehicle, said device comprising an implement support structure, said implement support structure comprising a first implement support arm, said first implement support arm being elongate and substantially rigid and having a proximate end and a distal end, said first implement support arm being attached at its proximate end to the undercarriage of the vehicle, and said distal end of said first implement support arm extending from the vehicle;

said implement support structure further comprising a rotating cross member, said rotating cross member being elongate and substantially rigid and having a first end and a second end, said rotating cross member being rotationally attached to the undercarriage of the vehicle at its first end, and said rotating cross member being rotationally attached to the undercarriage of the vehicle at its second end;

said implement support structure further comprising a first lift arm, said first lift arm being elongate and substantially rigid and having a proximate end, a distal end, and an open bracket located at its distal end, said bracket being suitably adapted to retain therein a portion of the first implement support arm, said first lift arm being attached at its proximate end to the rotating cross member, said first lift arm being located above the first implement support arm, and said first lift arm suitably adapted to support the first implement support arm, whereby the first implement support arm is slidably adjacent to the bracket of the first lift arm;

a lift mechanism, whereby said lift mechanism is suitably adapted to cause bi-directional rotation of the rotating cross member, whereby rotation of the rotating cross member causes the distal end of the first lift arm to move in an upward direction and in a downward direction, thereby causing the distal end of the first implement support arm to move in an upward direction and a downward direction; and a swing mechanism, whereby said swing mechanism is suitably adapted to move the distal end of the first implement support arm substantially laterally in both a leftward direction and a rightward direction.

2. The device of claim 1 wherein the implement support structure further comprises a second implement support arm, said second implement support arm being elongate and substantially rigid and having a proximate end and a distal end, with said second implement support arm dimensioned and configured substantially identically to the first implement support arm, said second implement support arm being attached at its proximate end to the undercarriage of the vehicle, and said distal end of said second implement support arm extending from the vehicle, with said second implement support arm being spaced apart from the first implement support arm;

the implement support structure further comprises a second lift arm, said second lift arm being elongate and substantially rigid and having a proximate end, a distal end, and an open bracket located at its distal end, said bracket being suitably adapted to retain therein a portion of the second implement support arm, with said second lift arm dimensioned and configured substantially identically to the first lift arm, said second lift arm being attached at its proximate end to the rotating cross member proximate to the second end of the rotating cross member, said second lift arm being located above the second implement support arm, said second lift arm suitably adapted to support the second implement support arm, whereby the second implement support arm is slidably adjacent to the bracket of the second lift arm, and said second lift arm being spaced apart from the first lift arm;

the first lift arm of the implement support structure is attached at its proximate end to the rotating cross member proximate to the first end of the rotating cross member;

the lift mechanism is suitably adapted to cause bi-directional rotation of the rotating cross member, whereby rotation of the rotating cross member causes the distal end of the second lift arm to move in an upward direction and in a downward direction, thereby causing the distal end of the second implement support arm to move in an upward direction and a downward direction; and the swing mechanism is suitably adapted to move the distal end of the second implement support arm substantially laterally in both a leftward direction and a rightward direction.

3. The device of claim 2 wherein the first implement support arm is pivotally attached at its proximate end to the undercarriage of the vehicle, the second implement support arm is pivotally attached at its proximate end to the undercarriage of the vehicle, the first lift arm is hingedly attached at its proximate end to the rotating cross member, and the second lift arm is hingedly attached at its proximate end to the rotating cross member.

4. The device of claim 3 wherein the implement support structure further comprises a first lever arm, said first lever arm being elongate and substantially rigid and having a proximate end and a distal end, said first lever arm being fixedly attached at its proximate end to the rotating cross member, and said first lever arm suitably adapted to rotate the rotating cross member when the distal end of said first lever arm is moved substantially vertically in both an upward direction and a downward direction;

wherein the lift mechanism is suitably adapted to move the distal end of the first lever arm substantially vertically in both an upward direction and a downward direction, causing bi-directional rotation of the rotating cross member, whereby rotation of the rotating cross member causes the distal end of the first and second lift arms to move in an upward direction and in a downward direction, thereby causing the distal ends of the first and second implement support arms to move in an upward direction and a downward direction.

5. The device of claim 3 wherein the lift mechanism comprises a reversing electric motor, said electric motor being suitably adapted to cause bi-directional rotation of the rotating cross member, whereby rotation of the rotating cross member causes the distal end of the first and second lift arms to move in an upward direction and in a downward direction, thereby causing the distal ends of the first and second implement support arms to move in an upward direction and a downward direction.

6. The device of claim 4 wherein the lift mechanism comprises a first lift device, said first lift device having a proximate end and a distal end, with said distal end movable in relation to said proximate end such that an overall length of said first lift device is capable of being altered as a result of relative movements of said distal and proximate ends of said first lift device, said first lift device being attached at its proximate end to the undercarriage of the vehicle, and said first lift device being attached at its distal end to the first lever arm, whereby said first lift device is suitably adapted to move the distal end of the first lever arm substantially vertically in both an upward direction and a downward direction, causing bi-directional rotation of the rotating cross member, thereby causing the distal ends of the first and second lift arms to move in an upward direction and in a downward direction, thereby causing the distal ends of the first and second implement support arms to move in an upward direction and a downward direction.

7. The device of claim 6 wherein the first lift device is a hydraulic piston.

8. The device of claim 6 wherein the first lift device is attached at its distal end to the first lever arm by a chain.

9. The device of claim 6 further comprising a lift control mechanism suitably adapted to control the relative movements of the distal and proximate ends of the first lift device to change the overall length of the first lift device, such that control of the first lift device by the lift control mechanism results in vertical movement of the distal end of the first lever arm in an upward direction and in a downward direction.

10. The device of claim 6 wherein the implement support structure further comprising a second lever arm, said second lever arm being elongate and substantially rigid and having a proximate end and a distal end, said second lever arm being fixedly attached at its proximate end to the rotating cross member, said second lever arm being spaced apart from and oriented substantially parallel to the first lever arm, and said second lever arm suitably adapted to rotate the rotating cross member when the distal end of said second lever arm is moved substantially vertically in both an upward direction and a downward direction.

11. The device of claim 10 wherein the lift mechanism comprises a second lift device, said second lift device having a proximate end and a distal end, with said distal end movable in relation to said proximate end such that an overall length of said second lift device is capable of being altered as a result of relative movements of said distal and proximate ends of said second lift device, said second lift device being attached at its proximate end to the undercarriage of the vehicle, and said second lift device being attached at its distal end to the second lever arm, whereby said second lift device is suitably adapted to move the distal end of the second lever arm substantially vertically in both an upward direction and a downward direction, causing bi-directional rotation of the rotating cross member, thereby causing the distal ends of the first and second lift arms to move in an upward direction and in a downward direction, thereby causing the distal ends of the first and second implement support arms to move in an upward direction and a downward direction.

12. The device of claim 11 further comprising a lift bar, said lift bar being elongate and substantially rigid and having a first end and a second end, said lift bar being oriented substantially perpendicular to the axis of the first implement support arm;

a first lift cable, said first lift cable having a first end and a second end; and a second lift cable said second lift cable having a first end and a second end;

wherein the distal end of the first lift device is attached to the lift bar proximate to the first end of the lift bar, the distal end of the second lift device is attached to the lift bar proximate to the second end of the lift bar, the first end of the first lift cable is attached to the lift bar proximate to the first end of the lift bar, the first end of the second lift cable is attached to the lift bar proximate to the second end of the lift bar, the second end of the first lift cable is attached to the first lever arm, and the second end of the second lift cable is attached to the second lever arm;

whereby the first and second lift devices are suitably adapted to move the lift bar substantially vertically in both an upward direction and a downward direction, causing the first and second lift cables to move substantially vertically in both an upward direction and a downward direction, moving the distal ends of the first lever arm and the second lever arm substantially vertically in both an upward direction and a downward direction, causing bi-directional rotation of the rotating cross member, whereby rotation of the rotating cross-member causes the distal ends of the first and second lift arms to move in an upward direction and in a downward direction, thereby causing the distal ends of the first and second implement support arms to move in an upward direction and a downward direction.

13. The device of claim 11 wherein the first lift device is a hydraulic piston and the second lift device is a hydraulic piston.

14. The device of claim 11 wherein the first lift device is attached at its distal end to the first lever arm by a chain and the second lift device is attached at its distal end to the second lever arm by a chain.

15. The device of claim 11 further comprising a lift control mechanism suitably adapted to simultaneously control the relative movements of the distal and proximate ends of the first lift device to change the overall length of the first lift device and the relative movements of the distal and proximate ends of the second lift device to change the overall length of the second lift device, with the changes in the overall lengths of the first lift device and the second lift device being substantially identical and synchronous, such that control of the first lift device and the second lift device by the lift control mechanism results in vertical movement of the distal ends of the first lever arm and the second lever arm in an upward direction and in a downward direction.

16. The device of claim 3 wherein the swing mechanism comprises a first swing device, said first swing device having a proximate end and a distal end, with said distal end movable in relation to said proximate end such that an overall length of said first swing device is capable of being altered as a result of relative movements of said distal and proximate ends of said first swing device, said first swing device being attached at its proximate end to the rotating cross member, and said first swing device being attached at its distal end to the first lift arm, whereby said first swing device is suitably adapted to move the distal end of the first lift arm substantially laterally in both a leftward direction and a rightward direction; and a second swing device, said second swing device having a proximate end and a distal end, with said distal end movable in relation to said proximate end such that an overall length of said second swing mechanism is capable of being altered as a result of relative movements of said distal and proximate ends of said second swing device, said second swing device being attached at its proximate end to the rotating cross member, and said second swing device being attached at its distal end to the second lift arm, whereby said second swing device is suitably adapted to move the distal end of the second lift arm substantially laterally in both a leftward direction and a rightward direction.

17. The device of claim 16 wherein the first swing device is a hydraulic piston and the second swing device is a hydraulic piston.

18. The device of claim 16 wherein the first swing device is hingedly attached at its proximate end to the to the rotating cross member, the first swing device is hingedly attached at its distal end to the first lift arm, the second swing device is hingedly attached at its proximate end to the to the rotating cross member, and the second swing device is hingedly attached at its distal end to the second lift arm.

19. The device of claim 16 further comprising a swing control mechanism suitably adapted to simultaneously control the relative movements of the distal and proximate ends of the first swing device to change the overall length of the first swing device and the relative movements of the distal and proximate ends of the second swing device to change the overall length of the second swing device, with the changes in the overall lengths of the first and second lift devices being substantially inverse and synchronous, such that control of the first and second swing devices by the swing control mechanism results in lateral movements of the distal ends of the first and second lift arms in a leftward direction and in a rightward direction.

20. The device of claim 3 wherein the swing mechanism comprises a first swing device, said first swing device having a proximate end and a distal end, with said distal end movable in relation to said proximate end such that an overall length of said first swing device is capable of being altered as a result of relative movements of said distal and proximate ends of said first swing device, said first swing device being attached at its proximate end to the undercarriage of the vehicle, and said first swing device being attached at its distal end to the first implement support arm, whereby said first swing device is suitably adapted to move the distal end of the first lift arm substantially laterally in both a leftward direction and a rightward direction; and a second swing device, said second swing device having a proximate end and a distal end, with said distal end movable in relation to said proximate end such that an overall length of said second swing mechanism is capable of being altered as a result of relative movements of said distal and proximate ends of said second swing device, said second swing device being attached at its proximate end to the undercarriage of the vehicle, and said second swing device being attached at its distal end to the second implement support arm, whereby said second swing device is suitably adapted to move the distal end of the second lift arm substantially laterally in both a leftward direction and a rightward direction.

21. The device of claim 20 wherein the first swing device is a hydraulic piston and the second swing device is a hydraulic piston.

22. The device of claim 2 wherein the first implement support arm has an upwardly angled bend between its proximate and distal ends, and the second implement support arm has an upwardly angled bend between its proximate and distal ends.

23. The device of claim 2 wherein the distal end of the first implement support arm is removably attached to the proximate end of the first implement support arm, and the distal end of the second implement support arm is removably attached to the proximate end of the second implement support arm.

24. The device of claim 2 further comprising a horizontal brace, said horizontal brace being substantially rigid and having a first end and a second end, said horizontal brace being hingedly attached at its first end to the first lift arm, and said horizontal brace being hingedly attached at its second end to the second lift arm.

25. The device of claim 24 further comprising a first lifting fork, wherein the first implement support arm is attached at its distal end to the first lifting fork, and a second lifting fork, wherein the second implement support arm is attached at its distal end to the second lifting fork;

whereby movement of the first and second implement support arms causes the first and second lifting forks to be moved in either a substantially vertical direction or in a substantially lateral direction or a combination of both substantially vertical and substantially lateral directions.

26. The device of claim 2 further comprising a pair of lifting forks, said lifting forks being substantially parallel to each other and connected to each other by a fork cross member, said fork cross member having a front side and a back side, said fork cross member having a first connection point located on its back side, and said fork cross member having a second connection point located on its back side, with the first connection point being located a distance from a vertical midline of the fork cross member and the second connection point being located a substantially equal distance from the vertical midline of the fork cross member on the opposite side of said vertical midline from the first connection point;

wherein the first implement support arm is pivotally attached at its distal end to the fork cross member at the first connection point of the fork cross member, and the second implement support arm is pivotally attached at its distal end to the fork cross member at the second connection point of the fork cross member;

whereby movement of the first and second implement support arms causes the lifting forks to be moved in either a substantially vertical direction or in a substantially lateral direction or a combination of both substantially vertical and substantially lateral directions.

27. The device of claim 2 further comprising a snowplow blade, said snowplow blade having a top edge, a bottom edge, a front face oriented outward, and a back side opposite said front face, said snowplow blade having a first connection point located on its back side, and said snowplow blade having a second connection point located on its back side, with the first connection point being located a distance from a vertical midline of the snowplow blade and the second connection point being located a substantially equal distance from the vertical midline of the snowplow blade on the opposite side of said vertical midline from the first connection point, with the first and second connection points located substantially equidistance from the top edge of the snowplow blade;

wherein the first implement support arm is pivotally attached at its distal end to the snowplow blade at the first connection point of the snowplow blade, and the second implement support arm is pivotally attached at its distal end to the snowplow blade at the second connection point of the snowplow blade;

whereby movement of the first and second implement support arms causes the snowplow blade to be moved in either a substantially vertical direction or in a substantially lateral direction or a combination of both substantially vertical and substantially lateral directions.

28. The device of claim 2 further comprising a container, said container having a top edge and a back side, said container having a first connection point located on its back side, and said container having a second connection point located on its back side, with the first connection point being located a distance from a vertical midline of the container and the second connection point being located a substantially equal distance from the vertical midline of the container on the opposite side of said vertical midline from the first connection point, with the first and second connection points located substantially equidistance from the top edge of the container;

wherein the first implement support arm is pivotally attached at its distal end to the container at the first connection point of the container, and the second implement support arm is pivotally attached at its distal end to the container at the second connection point of the container;

whereby movement of the first and second implement support arms causes the container to be moved in either a substantially vertical direction or in a substantially lateral direction or a combination of both substantially vertical and substantially lateral directions.

29. The device of claim 2 further comprising a platform, said platform having a back side, said platform having a first connection point located on its back side, and said platform having a second connection point located on its back side, with the first connection point being located a distance from a vertical midline of the platform and the second connection point being located a substantially equal distance from the vertical midline of the platform on the opposite side of said vertical midline from the first connection point;

wherein the first implement support arm is pivotally attached at its distal end to the platform at the first connection point of the platform, and the second implement support arm is pivotally attached at its distal end to the platform at the second connection point of the platform;

whereby movement of the first and second implement support arms causes the platform to be moved in either a substantially vertical direction or in a substantially lateral direction or a combination of both substantially vertical and substantially lateral directions.

30. The device of claim 3 further comprising an implement support arm attachment component, said implement support arm attachment component comprising a first attachment shaft, said first attachment shaft being substantially rigid and being attached to the undercarriage of the vehicle at a proximate end and having a first ball fixedly attached to a distal end, and said implement support arm attachment component comprising a second attachment shaft, said second attachment shaft being substantially rigid and being attached to the undercarriage of the vehicle at a proximate end and having a second ball fixedly attached to a distal end, said second attachment shaft being spaced apart from and oriented laterally to said first attachment shaft, said second attachment shaft dimensioned and configured substantially identical to said first attachment shaft and said second ball dimensioned and configured substantially identical to said first ball, wherein the proximate end of the first implement support arm is pivotally engaged with the first ball of the implement support arm attachment component and the proximate end of the second implement support arm is pivotally engaged with the second ball of the implement support arm attachment component.

* * * * *